July 19, 1966 F. HOCHBERG 3,262,047

RECTIFYING CIRCUITS USING PHOTOELECTRIC DEVICES

Filed Sept. 24, 1962

INVENTOR
FREDERICK HOCHBERG

BY John J Goodwin

ATTORNEY

United States Patent Office 3,262,047

Patented July 19, 1966

3,262,047

RECTIFYING CIRCUITS USING PHOTO-ELECTRIC DEVICES

Frederick Hochberg, Yorktown Heights, N.Y., assignor to International Business Machines Corporation, New York, N.Y., a corporation of New York Filed Sept. 24, 1962, Ser. No. 225,532
8 Claims. (Cl. 321—43)

The present invention relates to a circuit for rectifying alternating current signals and more particularly to a rectifying circuit employing photoemissive and photoconductive elements.

It is desirable to provide a rectifying circuit for rectifying relatively large currents yet employing relatively low current handling devices. It is also desirable that such circuits include electroluminescent and photoconductive devices, for in addition to the low current handling feature of these devices, they permit easier fabrication and reduced cost. A further advantage of a rectifying circuit as described, is that it is compatible for use in power supplies, etc., in systems employing El-Pc technology.

An object of the present invention is to provide an improved circuit for rectifying relatively large alternating currents.

Another object of the present invention is to provide a rectifying circuit using relatively low current handling devices.

A feature of the present invention is the provision of a rectifying circuit employing photoemissive and photoconductive devices as active circuit elements.

The foregoing and other objects, features and advantages of the invention will be apparent from the following more particular description of preferred embodiments of the invention, as illustrated in the accompanying drawings.

Figure 1:
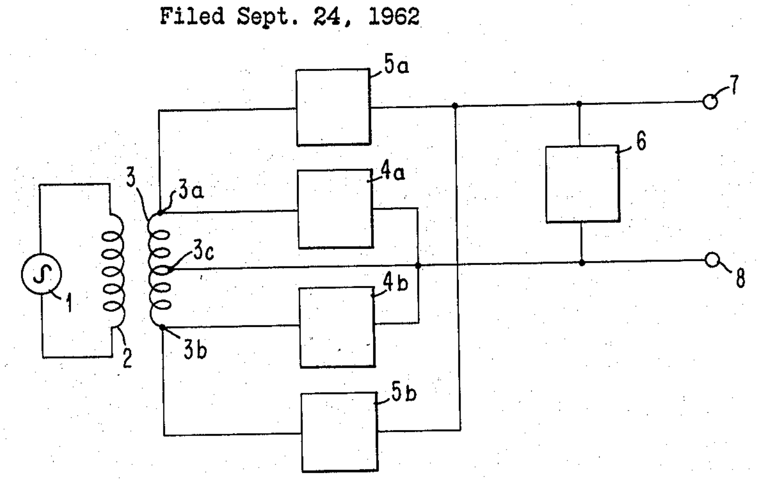
FIG. 1 is a block diagram of an embodiment of a rectifier circuit following the principles of the present invention.

Referring to FIG. 1, a circuit for rectifying alternating current signals following the principles of the present invention is shown including first and second input terminals 3*a* and 3*b*. Means, including source of alternating signal 1, transformer primary 2 and transformer primary 3 for applying an alternating current signal across first and second input terminals 3*a* and 3*b*. A first unidirectional photoemissive means 4*a* coupled to first input terminal 3*a* for producing illumination in response to alternating current flowing in a first direction. A second unidirectional photoemisive means 4*b* coupled to second input terminal 3*b* for producing illumination in response to alternating current flowing in a direction opposite to the first direction. A first photoconductive means 5*a* connected to first input terminal 3*a* for conducting portions of the alternating current in response to the illumination from first unidirectional photoemissive means 4*a* occurring when the alternating current is flowing in the first direction. A second photoconductive means 5*b* connected to second input terminal 3*b* for conducting portions of the alternating current in response to the illumination from the second unidirectional photoemissive means 4*b* occurring when the alternating current is flowing in a direction opposite to the first direction, and output means, including output terminal 7, connected to the first and second photoconductive means 5*a* and 5*b* for receiving the portions of the alternating current signal therefrom.

The output means further includes a second output terminal 8 connected to unidirectional photoemissive means 4*a* and 4*b* and also to a center-tap 3*c* on transformer secondary 3 for completing the circuit. If the alternating current input signal is referenced to ground potential, center-tap 3*c* may likewise be grounded.

More specifically, alternating current source 1 produces an alternating current signal which is coupled across transformer primary 2 to transformer secondary 3. It is desired to full-wave rectify this alternating current signal so that a D.C. signal is obtained across output terminals 7 and 8.

When the polarity at input terminal 3*a* is more negative than the polarity at center-tap 3*c*, first unidirectional photoemissive means 4*a* will conduct current through the circuit from center-tap 3*c*, through first photoemissive means 4*a* to input terminal 3*a* whereas second unidirectional photoemissive means 4*b* will be back biased and will not permit conduction from relatively positive input terminal 3*b* to center-tap 3*c*. The current conducted through first unidirectional photoemissive means 4*a* causes it to illuminate. The illumination from photoemissive means 4*a* is directed onto first photoconductive means 5*a*. Photoconductive means 5*a*, in the absence of illumination, presents a high impedance and therefore does not permit the signal present at terminal 3*a* to be conducted through to output terminal 7. However, when illuminated by first photoemissive means 4*a*, the impedance of first photoconductive means 5*a* decreases permitting the negative going portion of the alternating current signal to appear across output terminals 7 and 8, output terminal 8 being connected to center-tap 3*c*.

When the polarity of the alternating current input signal reverses and the polarity at input terminal 3*a* becomes more positive than center-tap 3*c*, first unidirectional photoemissive means 4*a* is back biased and ceases illumination. First photoconductive means 5*a* returns to its high impedance state. Meanwhile current flows through second unidirectional photoemissive means 4*b* from center-tap 3*c* back to relatively negative terminals 3*b* The current flowing through second unidirectional photoemissive means 4*b* causes it to illuminate, which illumination falls upon second photoconductive means 5*b*, decreasing the impedance thereof and permitting the negative going portion of the alternating current signal present at input terminal 3*b* to appear across output terminals 7 and 8. Output terminals 7 and 8 are bridged by a filter circuit 6 which smooths ripple and provides a relatively uniform direct current output signal across output terminals 7 and 8.

Figure 2:
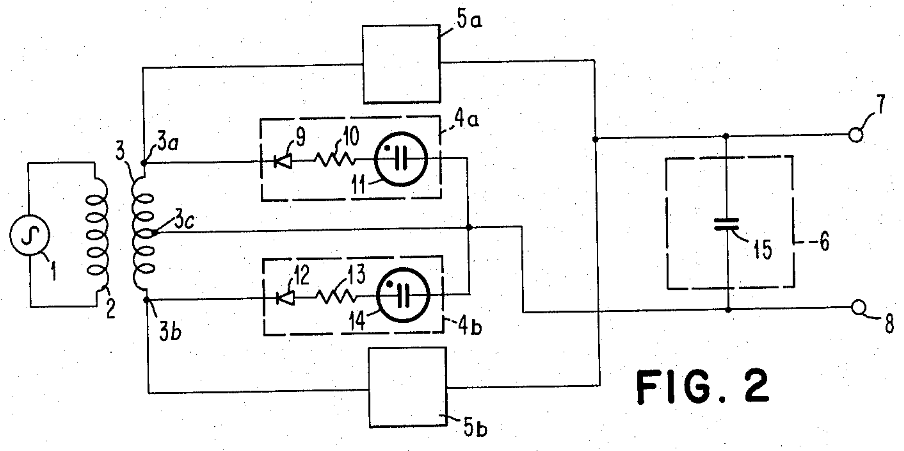
FIG. 2 is a schematic diagram of another embodiment of the present invention.

Referring to FIG. 2, a particular embodiment of the present invention which was generally discussed with reference to FIG. 1 is described. The circuit elements in FIG. 2 relating to similar elements generally described in FIG. 1 are assigned the same reference numbers. In FIG. 2 an alternating current signal from source 1 is coupled from transformer primary 2 to transformer secondary 3. The operation of the circuit of FIG. 2 is the same as that described for FIG. 1, that is, when the alternating current signal presents a relatively negative polarity at input terminal 3*a* with respect to center-tap 3*c*, first unidirectional photoemissive means 4*a* will conduct current causing illumination which in turn decreases the impedance of first photoconductive element 5*a*, permitting the negative going portion of the alternating current signal at input terminal 3*a* to appear across output terminals 7 and 8. When input terminal 3*b* is negative with respect to center-tap 3*c*, second unidirectional photoemissive means 4*b* conducts current causing illumination which decreases the impedance of second photoconductive means 5*b* and permits this negative going portion of the alternating current signal to be applied across output terminals 7 and 8. A conventional smoothing filter 6, for example capacitor 15, decreases the ripple and a negative D.C. signal is obtained across output terminals 7 and 8.

More specifically, in the embodiment of FIG. 2 unidirectional photoemissive means 4*a* and 4*b* include a diode, a resistor and a neon tube in series. First photoemissive means 4*a* includes diode 9, resistor 10 and neon tube 11, with diode 9 being connected such that is permits current to pass through and illuminate neon tube 11 when terminal 3*a* is negative with respect to center-tap 3*c*. Likewise, second photoemissive means 4*b* includes diode 12, resistor 13 and neon tube 14 with diode 12 being connected to pass current through and illuminate neon tube 14 when input terminal 3*b* is negative with respect to center-tap 3*c*. Photoconductive means 5*a* and 5*b* may be conventional photoconductive cells, for example, cells constructed of cadmium sulfide or cadmium selenide.

Figure 3:
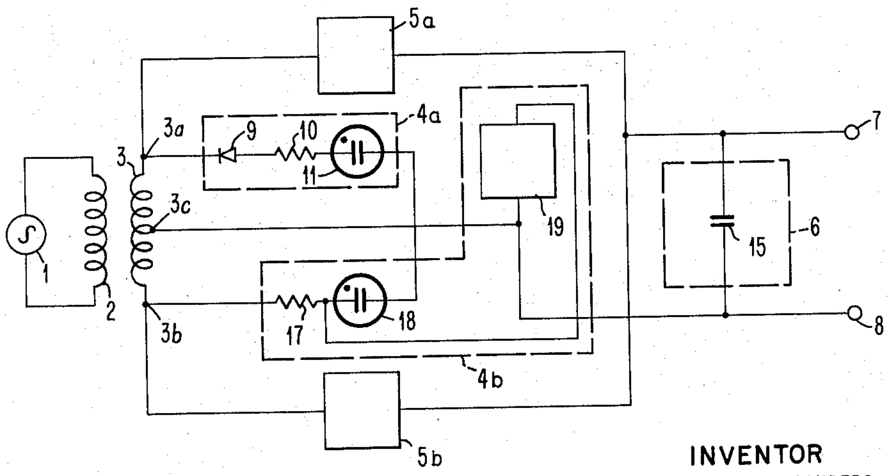
FIG. 3 is a schematic diagram of still another embodiment of the present invention.

Referring to FIG. 3, an alternate embodiment of the present invention is shown differing from the embodiment of FIG. 2 in that one diode may be eliminated by the inclusion of a third photoconductive cell. In FIG. 3, similar reference numbers are employed to designate circuit elements previously described in relation to FIGS. 1 and 2. In FIG. 3 the first unidirectional photoemissive means 4*a* includes a diode 9, a resistor 10 and a neon tube 11, therefore being identical to first photoemissive means 4*a* in FIG. 2. The second unidirectional photoemissive means 4*b* in FIG. 3, however, includes a resistor 17, a neon tube 18 and a photoconductive cell 19.

In operation, the alternating current signal from source 1 will be coupled via transformer primary 2 to the transformer secondary 3. When the polarity of input terminal 3*a* is negative with respect to center-tap 3*c*, diode 9 becomes forward biased and current passes from center-tap 3*c* through neon tube 11 to terminal 3*a*, terminal 3*b* being positive with respect to center-tap 3*c*. However, the illumination caused by the current passing through neon tube 11 not only falls upon first photoconductive cell 5*a* as in the other embodiments, but also upon photoconductive cell 19. The impedance of photoconductive cell 19 decreases to a relatively small value below that of the internal impedance of neon tube 18. Thus, the current originally to be conducted through neon tube 18 is shunted through photoconductive cell 19 and returns back through center-tap 3*c*. Therefore, the condition of the circuit when terminal 3*a* is negative and terminal 3*b* is positive with respect to center-tap 3*c* is that neon tube 11 is illuminated and neon tube 18 is dark. The illumination from neon tube 11 falling on first photoconductive cell 5*a* decreases the impedance thereof permitting the negative going portion of the alternating current input signal to appear across output terminals 7 and 8.

When the input signal alternates and terminal 3*b* is negative and terminal 3*a* is positive with respect to center-tap 3*c*, diode 9 is back biased preventing neon tube 11 from illuminating. First photoconductive cell 5*a* remains a high impedance preventing the signal at terminal 3*a* from reaching output terminal 7. Likewise, photoconductive cell 19 remains a high impedance, not being illuminated by neon tube 11.

Terminal 3*b*, being more negative than center-tap 3*c*, current will flow from center-tap 3*c* through neon tube 18 to terminal 3*b*, photoconductive cell 19 now being a higher impedance than neon tube 18. The illumination from neon tube 18 falls on photoconductive cell 5*b*, the impedance of which decreases, allowing the negative-going signal at terminal 3*b* to appear across output terminals 7 and 8. It is to be noted that photoconductive cell 19 is shielded from neon tube 18 so that the illumination from neon tube 18 does not cause the impedance of photoconductive cell 19 to decrease.

What has been described above is a circuit for rectifying relatively large currents, for example currents up to one ampere, with relatively low current handling devices which draw in the order of three milliamperes or less. FIGS. 2 and 3 specifically illustrate two embodiments of the rectifying circuit wherein the unidirectional photoemissive means 5*a* and 5*b* are diode and neon tube combinations or a neon and photoconductor cell combination. The embodiment of FIG. 1 is not limited to the use of neon tubes, the photoemissive means 5*a* and 5*b* may also be electroluminescent phosphor materials.

Certain electroluminescent phosphor materials conduct current in two directions and will require a diode or a shunting circuit to make them unidirectional as shown in FIGS. 2 and 3. However, the unidirectional photoemissive means 4*a* and 4*b* in FIG. 1 may also be embodied by using light emitting diodes which conduct current substantially in one direction. For example, gallium arsenide and gallium phosphide diodes having epataxial P and N contacts are both unidirectional and light emissive, and may be employed without using separate rectifying diodes in the embodiment of FIG. 1.

While the invention has been particularly shown and described with reference to preferred embodiments thereof, it will be understood by those skilled in the art that various changes in form and details may be made therein without departing from the spirit and scope of the invention.

What is claimed is:

1. A circuit for rectifying alternating current signals comprising first and second input terminals,
   means for applying an alternating current signal across said first and second input terminals,
   first unidirectional photoemissive means coupled to said first input terminal for producing illumination in response to said alternating current flowing in a first direction,
   second unidirectional photoemissive means coupled to said second input terminal for producing illumination in response to said alternating current flowing in a direction opposite said first direction,
   first photoconductive means connected to said first input terminal for conducting portions of said alternating current in response to said illumination from said first unidirectional photoemissive means occurring when said alternating current is flowing in said first direction,
   second photoconductive means connected to said second input terminal for conducting portions of said alternating current in response to said illumination from said second unidirectional photoemissive means occurring when said alternating current is flowing in a direction opposite said first direction,
   and output means connected to said first and second photoconductive means for receiving the portions of said alternating current signal therefrom for providing a relatively direct current output signal.

2. A circuit according to claim 1 wherein both said first and second unidirectional photoemissive means include a diode and a neon tube connected in series circuit.

3. A circuit according to claim 1 wherein said first unidirectional photoemissiven means includes a diode and a neon tube connected in series circuit and wherein said second unidirectional photoemissive means includes a neon tube and a third photoconductive means connected in parallel circuit.

4. A circuit according to claim 1 wherein said first and second unidirectional photoemissive means include a diode and an electroluminescent phosphor element.

5. A circuit according to claim 1 wherein said first and second unidirectional photoemissive means include a gallium arsenide element.

6. A circuit according to claim 1 wherein said first and second unidirectional photoemissive means include a gallium phosphide element.

7. A circuit for rectifying alternating current signals comprising a transformer including primary and secondary windings, means for applying an alternating current signal across said transformer windings, a first circuit including a first diode, a first resistor, and a first neon tube coupled in series and connected to one end of said transformer secondary winding, said first diode conducting said alternating current flowing in a first direction for illuminating said first neon tube, a second circuit including a second diode, a second resistor and a second neon tube coupled in series and connected to the other end of said transformer secondary winding, said second diode conducting said alternating current flowing in a direction opposite said first direction for illuminating said second neon tube, a first photoconductive element connected to said one end of said transformer secondary winding and optically coupled to said first neon tube for conducting portions of said alternating current signal in response to said illumination from said first neon tube, a second photoconductive element connected to said other end of said transformer secondary winding and optically connected to said second neon tube for conducting portions of said alternating current signal in response to said illumination from said second neon tube, and first and second output terminals for providing a relatively direct current output signal, said first output terminal connected to said first and second photoconductive elements for receiving said portions of said alternating current signal conducted thereby, and said second output terminal connected to said first and second neon tubes and to a center point of said transformer secondary winding.

8. A circuit for rectifying alternating current signals comprising a transformer including primary and secondary windings, means for applying an alternating current signal across said transformer windings, a first circuit including a diode, a first resistor, and a first neon tube coupled in series and connected to one end of said transformer secondary winding, said diode conducting said alternating current flowing in a first direction for illuminating said first neon tube, a second circuit including a second resistor and a second neon tube coupled in series and connected to the other end of said transformer secondary winding, and a first photoconductive element connected in parallel with said second neon tube, said first photoconductive element optically coupled to said first neon tube for shunting said alternating current flowing in said first direction past said second neon tube in response to illumination from said first neon tube, said second neon tube illuminating in response to alternating current flowing in a direction opposite said first direction, a second photoconductive element connected to said one end of said transformer secondary winding and optically coupled to said first neon tube for conducting portions of said alternating current signal in response to said illumination from said first neon tube, a third photoconductive element connected to said other end of said transformer secondary winding and optically connected to said second neon tube for conducting portions of said alternating current signal in response to said illumination from said second neon tube, and first and second output terminals for providing a relatively direct current output signal, said first output terminal connected to said second and third photoconductive elements for receiving said portions of said alternating signal conducted thereby, and said second output terminal connected in common to said first and second neon tubes, said first photoconductive element, and to a center point of said transformer secondary winding.

References Cited by the Examiner

UNITED STATES PATENTS

| | | | |
|---|---|---|---|
| 2,815,487 | 12/1957 | Kaufman | 321—8 X |
| 2,907,887 | 10/1959 | Beck | 250—209 X |

FOREIGN PATENTS

| | | |
|---|---|---|
| 441,194 | 1/1936 | Great Britain. |

JOHN F. COUCH, *Primary Examiner.*

LLOYD McCOLLUM, *Examiner.*

J. M. THOMSON, M. WACHTELL, *Assistant Examiners.*